(12) United States Patent
Goldsberry

(10) Patent No.: US 12,102,042 B2
(45) Date of Patent: Oct. 1, 2024

(54) PROTECTIVE DEVICE FOR UNDERGROUND IRRIGATION SYSTEMS

(71) Applicant: Stuart G. Goldsberry, Milwaukie, OR (US)

(72) Inventor: Stuart G. Goldsberry, Milwaukie, OR (US)

( * ) Notice: Subject to any disclaimer, the term of this patent is extended or adjusted under 35 U.S.C. 154(b) by 0 days.

(21) Appl. No.: 18/542,202

(22) Filed: Dec. 15, 2023

(65) Prior Publication Data

US 2024/0196815 A1  Jun. 20, 2024

Related U.S. Application Data

(60) Provisional application No. 63/387,820, filed on Dec. 16, 2022.

(51) Int. Cl.
*B05B 15/16* (2018.01)
*A01G 25/06* (2006.01)
*B05B 15/00* (2018.01)

(52) U.S. Cl.
CPC .................... *A01G 25/06* (2013.01)

(58) Field of Classification Search
CPC .......... A01G 25/06; B05B 15/16; B05B 15/74
See application file for complete search history.

(56) References Cited

U.S. PATENT DOCUMENTS

| | | | | |
|---|---|---|---|---|
| 663,386 A * | 12/1900 | Hobbs | ...................... | F16L 9/17 |
| | | | | 138/167 |
| 2,713,352 A * | 7/1955 | Schustack | ............... | F16L 21/06 |
| | | | | 24/284 |
| 5,772,118 A | 6/1998 | Fabiano | | |
| 6,494,386 B1 * | 12/2002 | Banu | ....................... | B05B 15/74 |
| | | | | 239/206 |
| 6,543,704 B2 | 4/2003 | Stephens | | |
| 8,936,206 B1 | 1/2015 | Wright | | |
| 10,220,403 B2 | 3/2019 | Orth | | |
| 2010/0127099 A1 | 5/2010 | Memole | | |
| 2017/0028236 A1 * | 2/2017 | Macomber | ............. | A62C 37/08 |
| 2017/0320086 A1 * | 11/2017 | Orth | ........................ | B05B 15/16 |
| 2023/0173316 A1 * | 6/2023 | Friend | ..................... | B05B 15/16 |
| | | | | 169/51 |

FOREIGN PATENT DOCUMENTS

| | | | | |
|---|---|---|---|---|
| CN | 107409954 A | * | 12/2017 | |
| CN | 113439647 A | * | 9/2021 | |
| KR | 101040483 B1 | * | 6/2011 | |
| KR | 1900039 B1 | * | 9/2018 | ............. A62C 31/02 |

* cited by examiner

Primary Examiner — Frederick L Lagman
Assistant Examiner — Stacy N Lawson

(57) ABSTRACT

The protective sleeve device is intended to prevent damage to irrigation equipment caused by trees, shrubs, and grass roots. The device is a copper sleeve designed to naturally repel plant roots. The profile shape of the device enables it to fit around any pop-up style sprinkler head. Preferably, the device is made of rectangular panel that is rolled into a cylinder and held in shape by curved edges of the panel. Due to the unique one-piece construction, the device easily installs on both new and existing irrigation systems. Thus, as tree roots expand, the copper material in the device naturally deflects the tree roots away from the sensitive irrigation equipment. In addition, the device can be adapted to fit side-mounted pop-up sprinkler heads with the help of a cutout provision, wherein the user can insert the side-mounted pop-up sprinkler inlet tube into the groove of the cutout.

1 Claim, 14 Drawing Sheets

PROTECTIVE DEVICE FOR UNDERGROUND IRRIGATION SYSTEMS

FIELD OF THE INVENTION

The present invention relates generally to protective covers. More specifically, the present invention is a copper sleeve designed to fit over pop-up style sprinkler heads. When installed, the copper material in the sleeve repels tree roots, thereby protecting underground irrigation equipment.

BACKGROUND OF THE INVENTION

Many homeowners today use underground sprinkler systems to water their lawns. These systems are a convenient, cost-effective solution to having a green and healthy lawn all year round. An underground irrigation system comprises a network of underground pipes buried below grade. The pipe network is connected to a water source, which distributes water throughout the pipe network and then to a series of risers. Each riser is fitted to a sprinkler head, which helps distribute the water across different areas of the lawn. Pop-up style sprinkler heads, in particular, are popular among homeowners because they are designed to distribute water evenly over the lawn surface, thus mimicking a rain shower. Overall, pop-up style sprinkler heads offer great usability, provide maximum water efficiency, and are concealed when not in use.

However, just like with any other type of outdoor equipment, lawn sprinkler systems are exposed to harsh environmental conditions, leaving them vulnerable to damage caused by above-ground hazards (e.g., storm damage), as well as below-ground hazards (e.g., root damage). One of the challenges in maintaining a lawn sprinkler system is the fact that over time, nearby tree roots can spread across the pipe network and cause damage to the irrigation equipment. Some areas of a lawn are more prone to damage than other areas. For example, when a sprinkler zone completes its cycle, each sprinkler head weeps a certain amount of water. This depends on the style of sprinkler and grade changes of the site. Most often, the trees, shrubs, and grass roots tend to concentrate around the extra water that accumulates at a particular site, eventually damaging the sprinkler. Even a one-time repair can negate the savings benefit and convenience of using a lawn sprinkler system. Therefore, a need exists to develop an affordable, easy-to-use product that prevents damage to irrigation equipment caused by trees, shrubs, and grass roots.

An objective of the present invention is to provide a solution to the aforementioned problem. The present invention is a protective sleeve that attaches to pop-up style sprinkler heads. The device is made entirely out of a root repelling material, such as copper, and can easily be installed in both new and existing irrigation systems. The copper material is durable and resistant to rust. But more importantly, copper naturally repels tree roots. According to the Centre for Plant Sciences at the University of Leeds, copper ions inhibit plant root elongation at the root tip. As such, the copper sleeve is designed to help keep grass, shrubs, and tree roots away from sensitive irrigation equipment. The device can be manufactured in various lengths (4"-16") and is designed to fit the most common pop-up style sprinkler heads made by leading manufacturers (e.g., Rainbird®, Toro®, Hunter®, Orbit®). In addition, the device contains provisions for a cutout that can be used to fit side-mounted pop-up sprinkler heads.

SUMMARY

It is an aim of the present invention to prevent damage to irrigation equipment caused by trees, shrub, and grass roots. The present invention is a copper sleeve designed to naturally repel plant roots. The profile shape of the device enables it to fit around any pop-up style sprinkler head. Due to its unique one-piece construction, the device easily installs on both new and existing irrigation systems. Thus, as tree roots expand, the copper material in the device naturally deflects the tree roots away from the sensitive irrigation equipment. In addition, the device can be adapted to fit side-mounted pop-up sprinkler heads. Specifically, the device contains cutout provisions which can be trimmed to create a door. When the door is opened, the user can insert the side-mounted pop-up sprinkler head inlet tube into the groove of the newly created cutout.

DETAIL DESCRIPTIONS OF THE INVENTION

Figure 1:
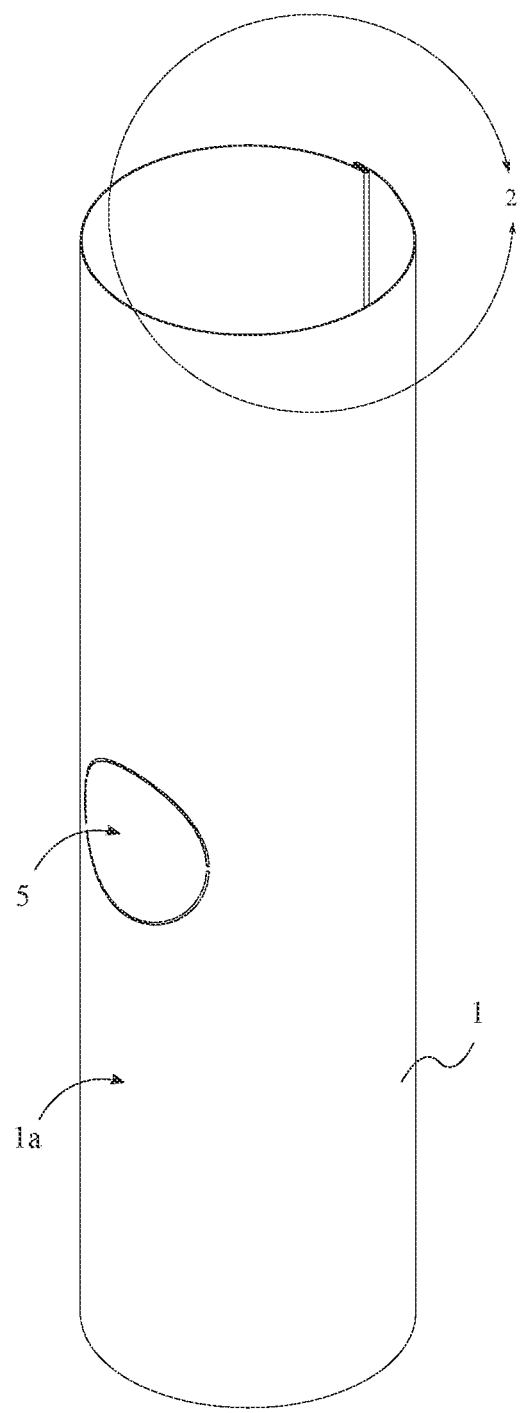
FIG. 1 is a top-front-left perspective view of the present invention.
Figure 2:
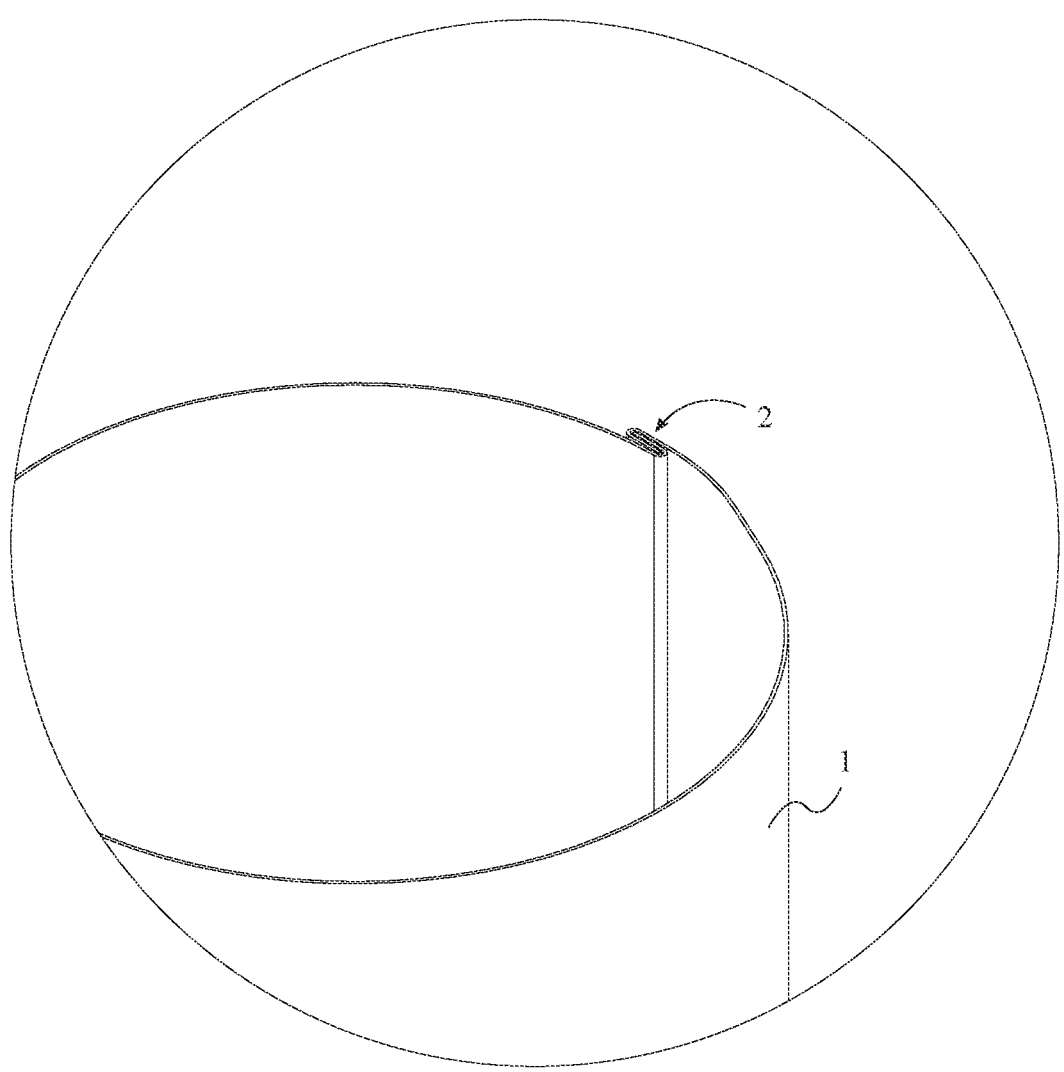
FIG. 2 is a detailed view of section 2 of FIG. 1.
Figure 3:
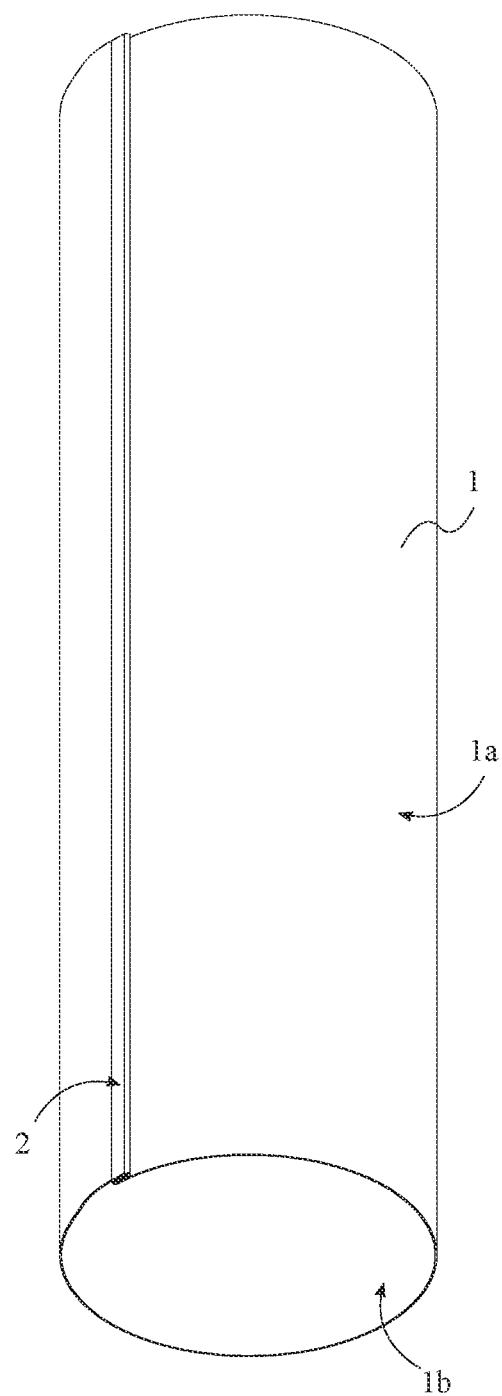
FIG. 3 is a bottom-rear-right perspective view of the present invention.

All illustrations of the drawings are for the purpose of describing selected versions of the present invention and are not intended to limit the scope of the present invention.

In reference to FIG. 1 through FIG. 14, the present invention is a protective device for underground irrigation systems.

The following description is in reference to FIG. 1 through FIG. 14. According to a preferred embodiment, the present invention comprises a protective sleeve 1, and at least one fastener 2. Preferably, the protective sleeve 1 is cylindrical in shape and is a sleeve manufactured entirely out of copper material, designed to fit over a pop-up style sprinkler head (sprinkler head) for the purpose of protecting underground irrigation systems from damage caused by tree roots. For a better understanding of how the present invention achieves this result, it is important to understand the effect copper has on tree roots. A research study conducted by the University of Leeds has shown that copper ions inhibit tree root elongation at the root tip. Thus, the copper material in the present invention is capable of deflecting tree roots away from the sensitive irrigation equipment. However, the protective sleeve 1 may comprise any other shape and root repelling material that is known to one of ordinary skill in the art, as long as the intents of the present invention are not altered.

As seen in FIG. 1 through FIG. 8, the protective sleeve 1 is formed by rolling a rectangular panel into a cylinder. To that end, the protective sleeve 1 comprises a first surface 1a, a second surface 1b, a first terminal edge 1c and a second terminal edge 1d. Preferably, the first surface 1a is positioned opposite to the second surface 1b across a thickness 1e of the protective sleeve 1. In other words, the first surface 1a constitutes an external surface of the protective sleeve 1 that is positioned outside the irrigation equipment that the sleeve is protecting, and the second surface 1b constitutes the internal surface that is facing the irrigation equipment. Preferably, the thickness of the protective sleeve 1 ranges between 16 millimeters and 22 millimeters. This range is chosen so that the sleeve is not too thin which may make the sleeve wrinkle while being used, and not too thick to roll into the sleeve. Additionally, making the protective sleeve 1 not too thick also helps make the product cost-efficient, since the sleeve is made fully of copper. Further, the first terminal edge 1c is positioned opposite to the second terminal edge 1d, across a length 1f of the protective sleeve 1. In other words, the first terminal edge 1c and the second terminal edge 1d are opposing edges of the panel that when rolled towards each other form the cylindrical protective sleeve. Furthermore, the fastener 2 is operably integrated between the first terminal edge 1c and the second terminal edge 1d, wherein operating the fastener 2 governs opening and closing of the protective sleeve 1. In other words, the fastener 2 helps the protective sleeve 1 to hold its shape and securely be mounted around an underground irrigation equipment like a sprinkler head.

Figure 8:
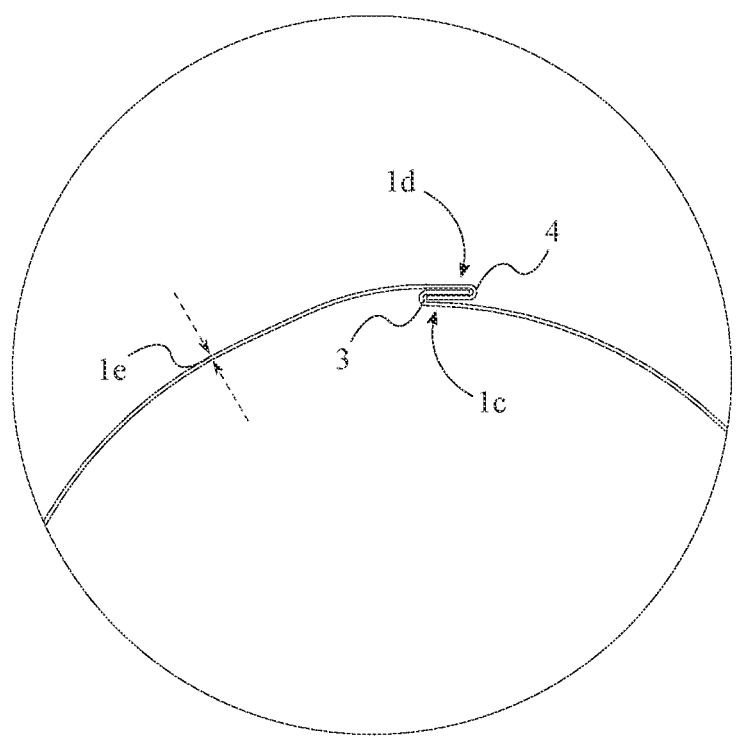
FIG. 8 is a detailed view of section 8 of FIG. 7.
Figure 9:
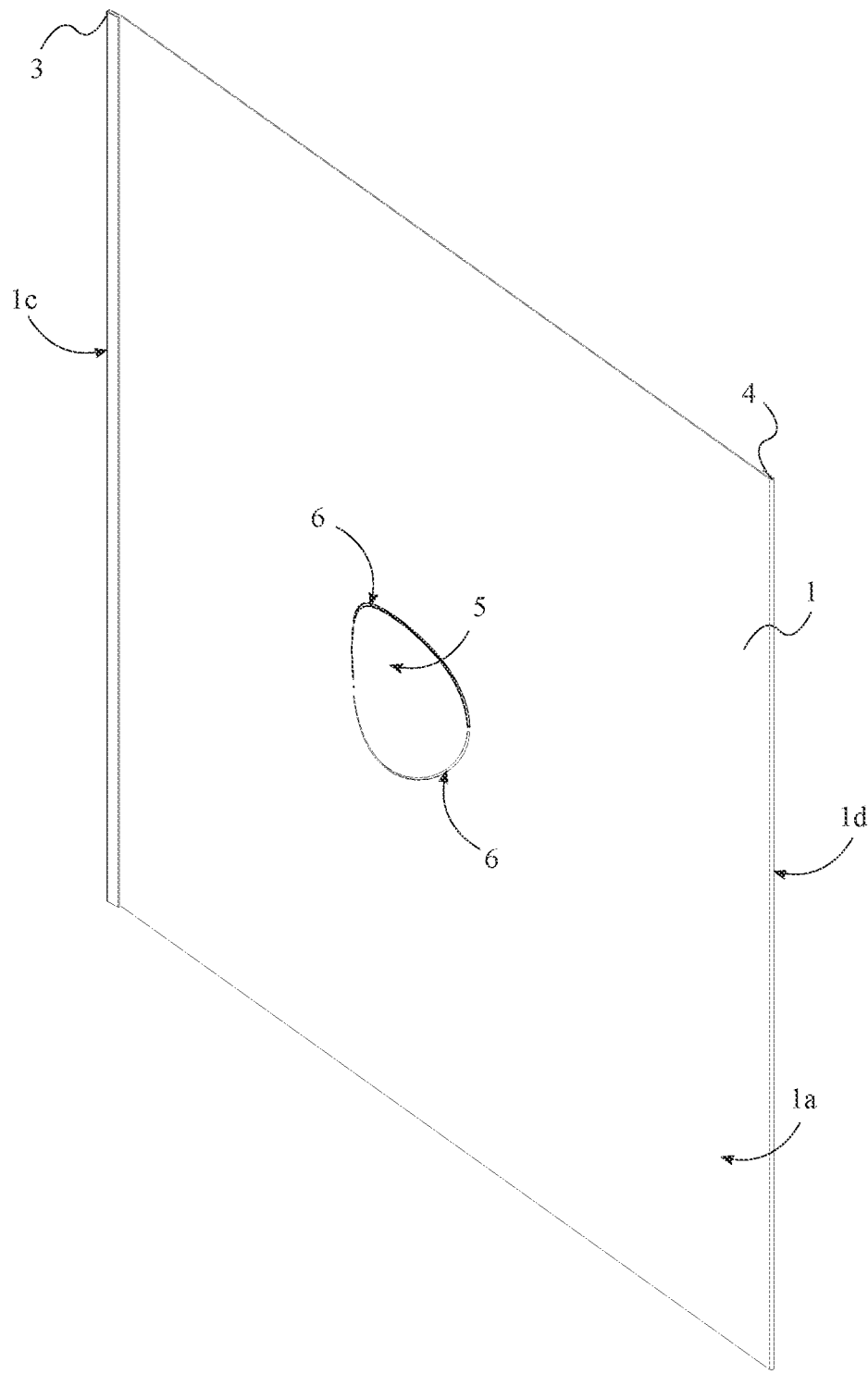
FIG. 9 is a top-front perspective view of the present invention in an open configuration.
Figure 10:
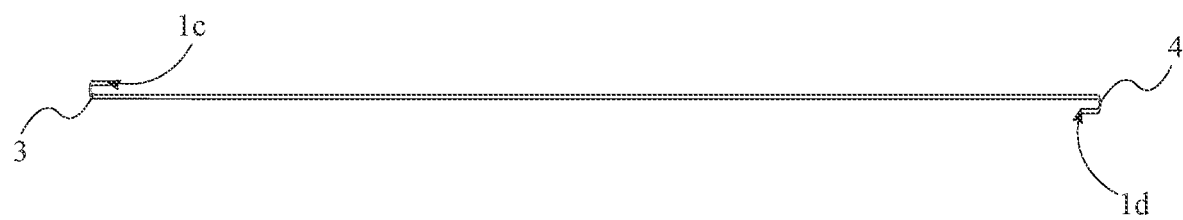
FIG. 10 is a top plan view of the present invention in an unfastened and open configuration.
Figure 11:
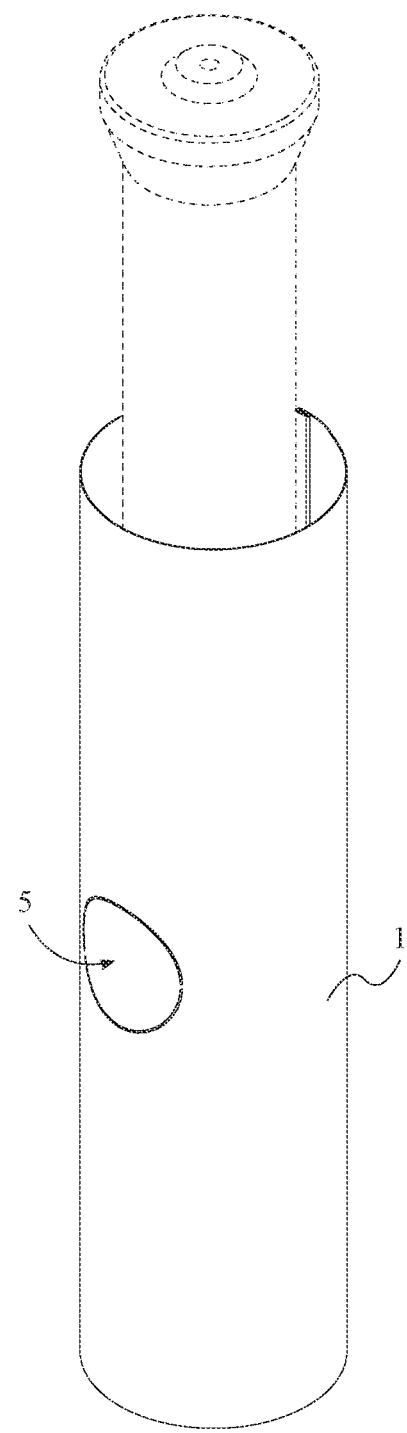
FIG. 11 is a top front left perspective view of the present invention, wherein a pop-up sprinkler head in an extended configuration is mounted within the protective sleeve.
Figure 12:
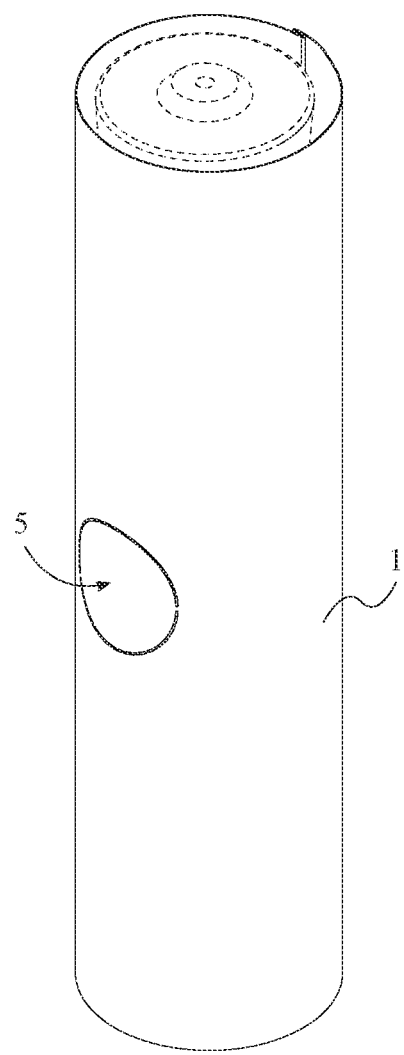
FIG. 12 is a top front left perspective view of the present invention, wherein a sprinkler is mounted within the protective sleeve in a retracted configuration.

According to the preferred embodiment, the protective sleeve 1 is made from a rectangular panel that is rolled into a tube like or cylindrical shape. As previously discussed, the fastener 2 holds the shape of the protective sleeve 1. In the preferred embodiment, the first terminal edge 1c is bent in a first direction to form a first open curve 3, and the second terminal edge 1d is bent in a second direction to form a second open curve 4. As seen in FIG. 8, the first open curve 3 is oriented opposite to the second open curve 4. Accordingly, the first open curve 3 and the second open curve 4 together act like a hook system to keep the protective sleeve 1 in the tube shape. In other words, the first open curve 3 and the second open curve 4 are detachably engaged to form the fastener 2. However, the fastener 2 may comprise any other shape, size, fastening technique or technology, that are known to one of ordinary skill in art, as long as the intents of the present invention are not altered. Further, unfastening of the fastener 2 opens the protective sleeve 1 into a rectangular panel with curved edges. As seen in FIG. 9, this ability to unwrap into the rectangular panel helps with easy transportation and installation of the present invention.

Figure 13:
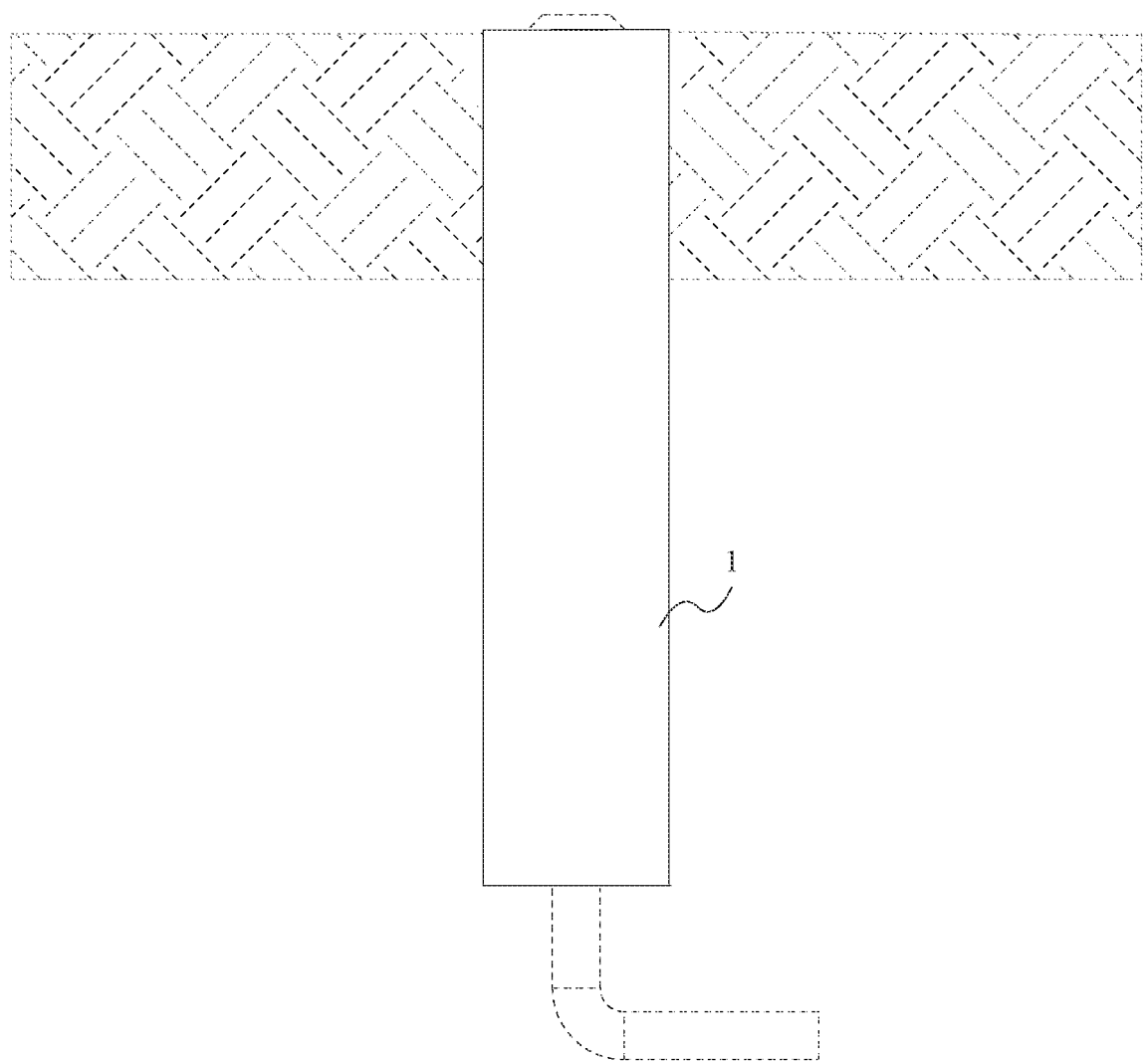
FIG. 13 is a front elevational view of the present invention, shown with a bottom-mounted pop-up sprinkler head installed in the ground, wherein the protective sleeve does not have a cutout provision.

In a preferred embodiment, as seen in FIG. 11 through FIG. 14, the copper sleeve attaches to a sprinkler head by wrapping the protective sleeve 1 around the sprinkler head and fastening the fastener 2 so that all surrounding surfaces of the sprinkler head are covered. Thus, the sprinkler head is not only protected against damage caused by tree roots, but also from other underground hazards such as rocks, dirt, and debris. When properly fitted, the sprinkler head can be installed to an underground water supply line (e.g., riser), as seen in FIG. 13. Further, the protective copper sleeve 1 may be manufactured in a variety of tube lengths in order to fit any size pop-up sprinkler head. Thus, the circumference of the protective sleeve is large enough to go around a vertical pop-up sprinkler head.

Figure 14:
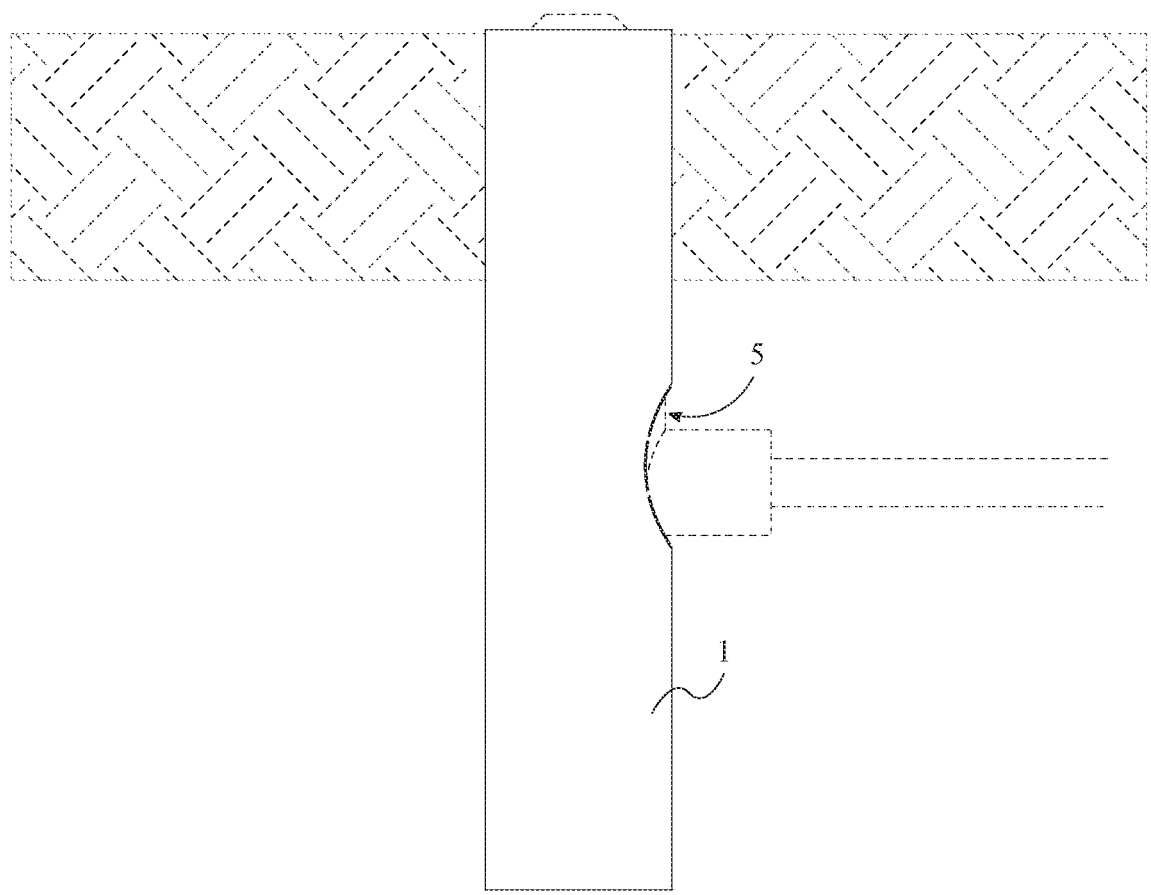
FIG. 14 is a left-side elevational view of the present invention, shown with a side-mounted pop-up sprinkler head installed in the ground.

As seen in FIG. 14, the copper sleeve 1 can also be adapted to fit sprinkler heads having a side-mounted inlet tube. To accomplish this, the present invention comprises at least one cutout provision 5, and the cutout provision 5 is laterally integrated onto the protective sleeve 1. Preferably, the cutout provision 5 is removed to establish a path for the inlet tube through the protective sleeve 1. To that end, the cutout provision 5 comprises a plurality of perforations 6, wherein the plurality of perforations 6 traverses laterally through the protective sleeve 1. Before attaching the sprinkler head, the user must first modify the protective sleeve 1 by trimming away the along the plurality of perforations 6. Due to the soft copper material, trimming can easily be performed using a handheld rotary tool or any other cutting device (e.g., sawblade).

Figure 4:
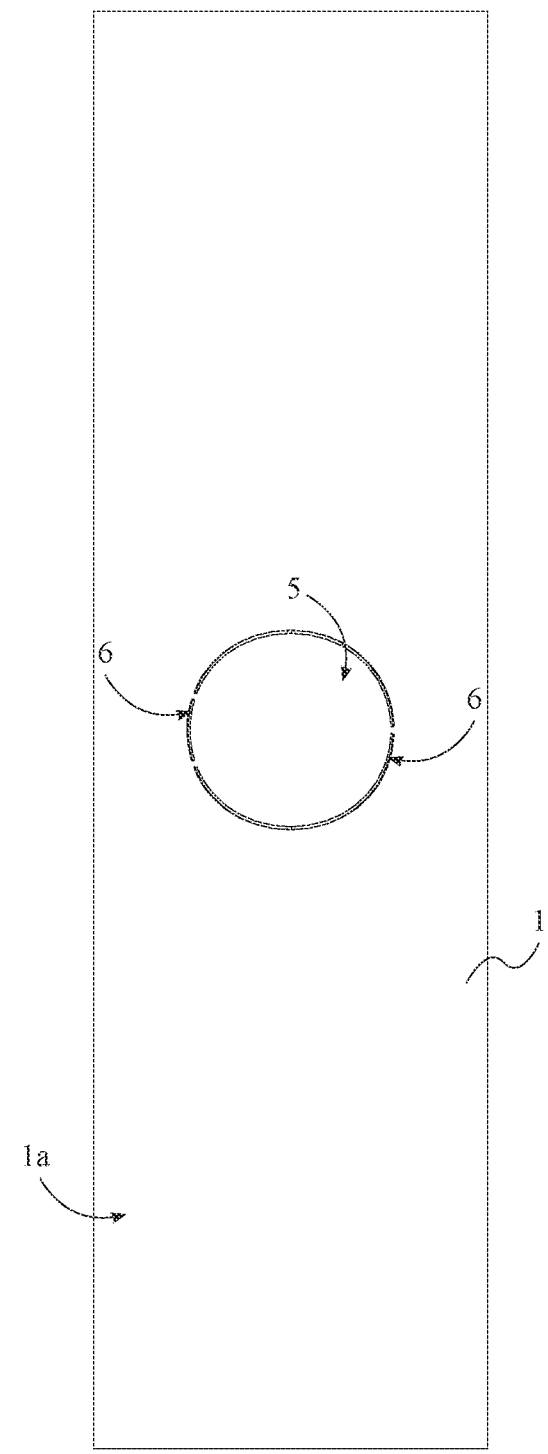
FIG. 4 is a front elevational view of the present invention.
Figure 5:
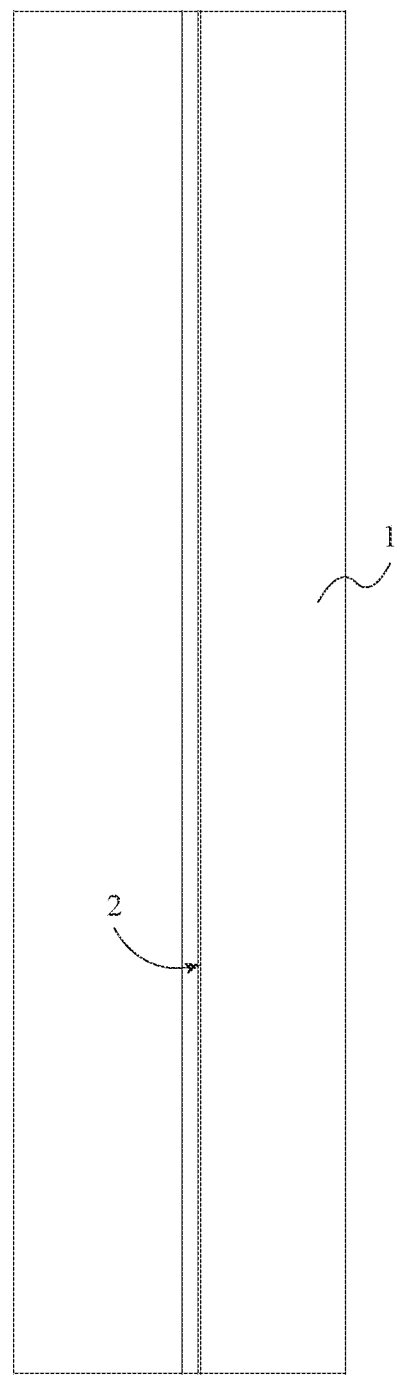
FIG. 5 is a rear elevational view of the present invention.
Figure 6:
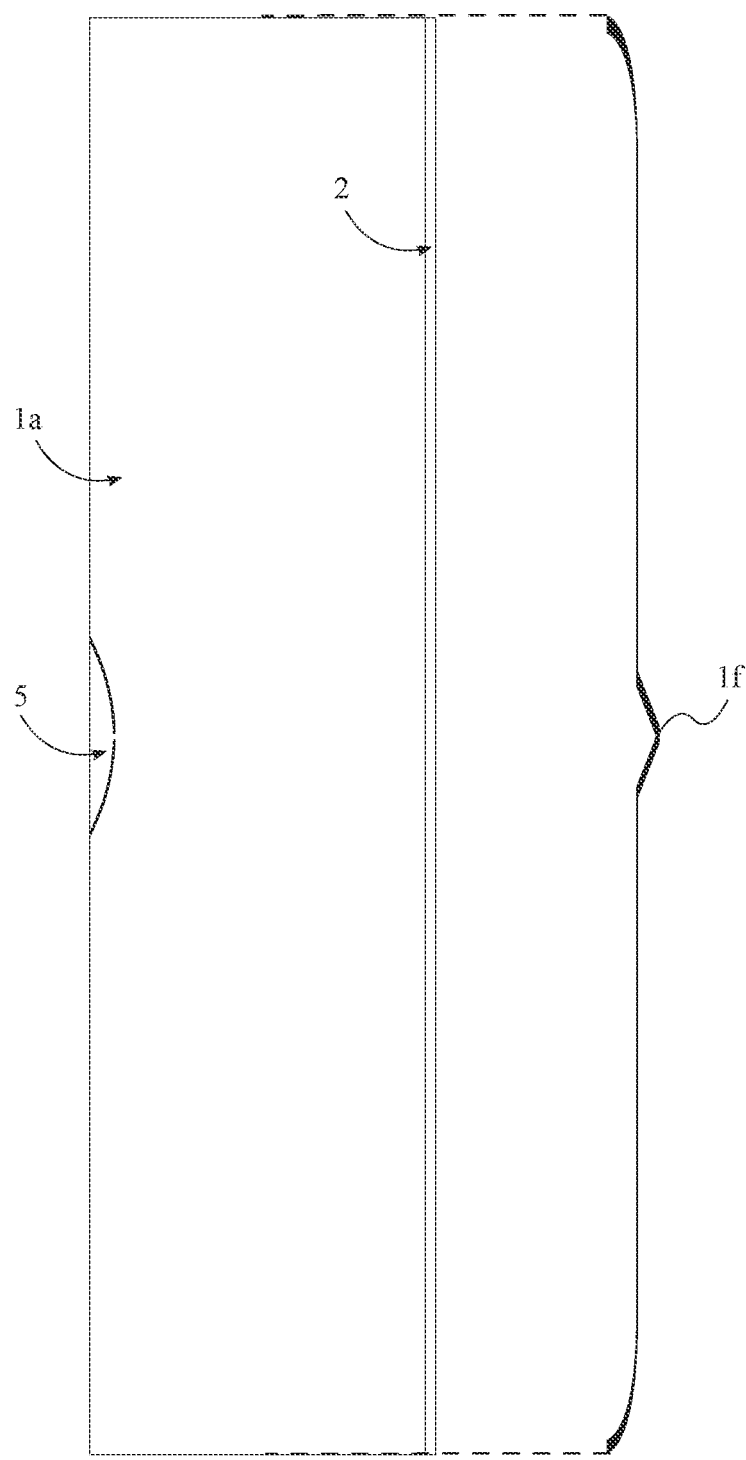
FIG. 6 is left-side elevational view of the present invention.
Figure 7:
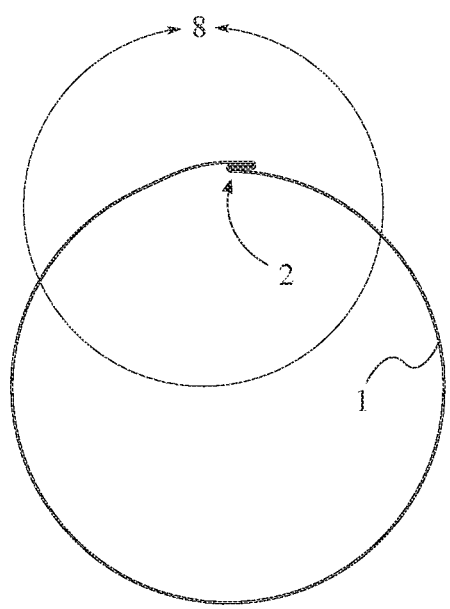
FIG. 7 is a top-plan view of the present invention.

As seen in FIG. 4, the cutout provision 5 is circular in shape, and the cutout provision 5 is centrally positioned along the length 1f of the protective sleeve 1. Preferably, the diameter of the cutout provision 5 is large enough to fit an inlet tube of a side mounted pop-up sprinkler head. However, the cutout provision 5 may be located at any different location and may comprise any other shape, as long as the intents of the present invention are not altered.

Although the invention has been explained in relation to its preferred embodiment, it is to be understood that many other possible modifications and variations can be made without departing from the spirit and scope of the invention as hereinafter claimed.

What is claimed is:

1. A protective device for underground irrigation system, the protective device comprising:
    a protective sleeve;
    at least one fastener;
    at least one cutout provision;
    the protective sleeve being cylindrical in shape;
    the protective sleeve being made of copper;
    the protective sleeve capable of repelling tree roots;
    the protective sleeve comprising a first surface, a second surface, a first terminal edge and a second terminal edge, a top opening and a bottom opening, wherein the top opening forms an unobstructed passageway of the protective device;
    the first surface being positioned opposite to the second surface across a thickness of the protective sleeve;
    the thickness of the protective sleeve ranging from 16 millimeters to 22 millimeters;
    the first terminal edge being positioned opposite to the second terminal edge, across a length of the protective sleeve;
    the fastener being operably integrated between the first terminal edge and the second terminal edge, wherein operating the fastener governs opening and closing of the protective sleeve;
    the cutout provision being laterally integrated onto the protective sleeve;
    a diameter of the cutout provision being large enough to fit an inlet tube of a side mounted pop-up sprinkler head;
    the cutout provision comprising a plurality of perforations;

the plurality of perforations traversing laterally through the protective sleeve;
the first terminal edge being bent in a first direction to form a first open curve;
the second terminal edge being bent in a second direction to form a second open curve;
the first open curve being oriented opposite to the second open curve; and
the first open curve being hooked to and making direct contact with the second open curve to form the fastener, wherein unfastening of the fastener opens the protective sleeve into a rectangular panel with curved edges.

* * * * *